No. 844,414.
PATENTED FEB. 19, 1907.
P. F. SEABLOOM.
HEDGE TRIMMER.
APPLICATION FILED OCT. 5, 1906.
2 SHEETS—SHEET 2.
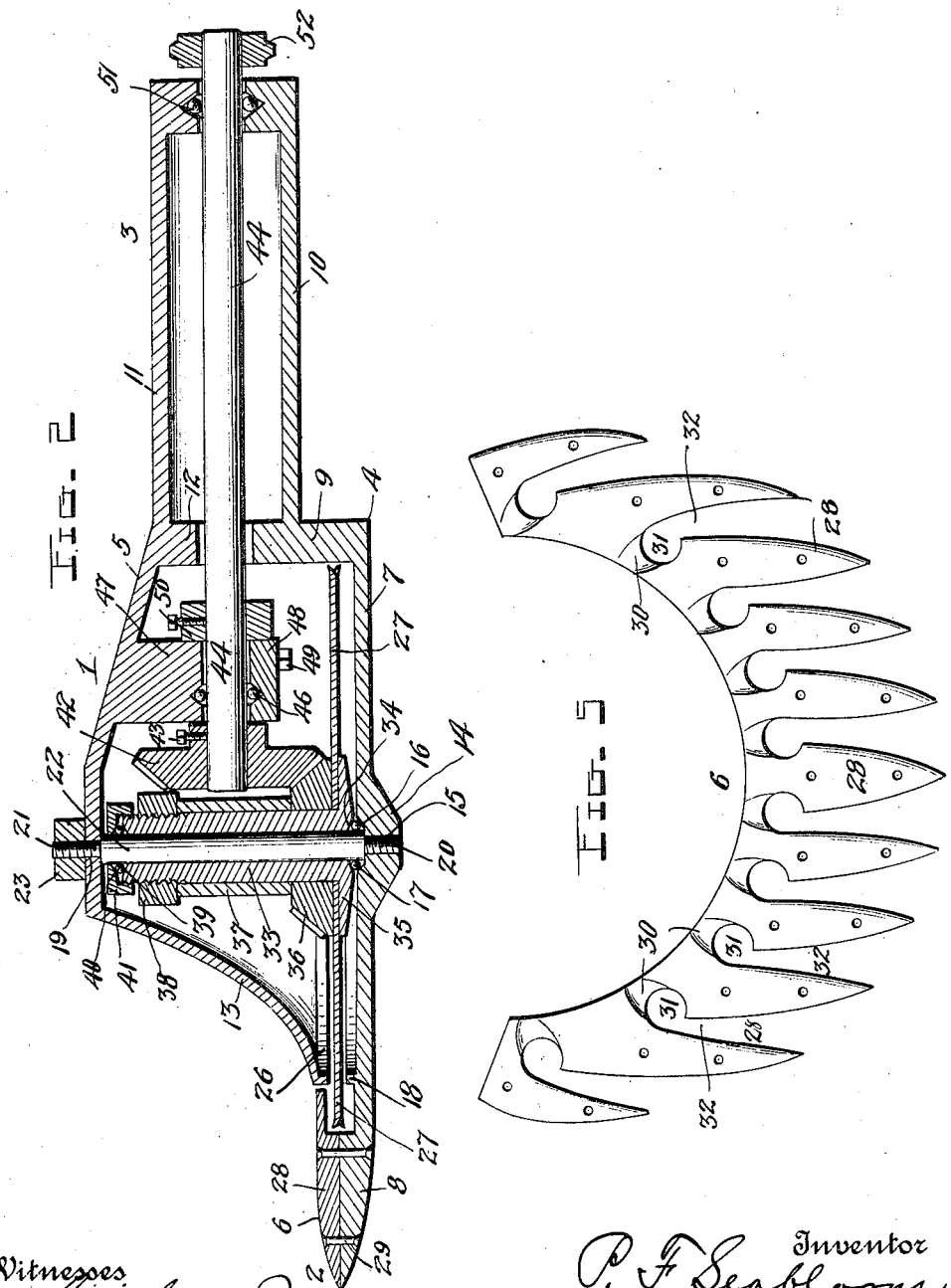
Witnesses
Inventor
P. F. Seabloom
by Watson E. Coleman
Attorney

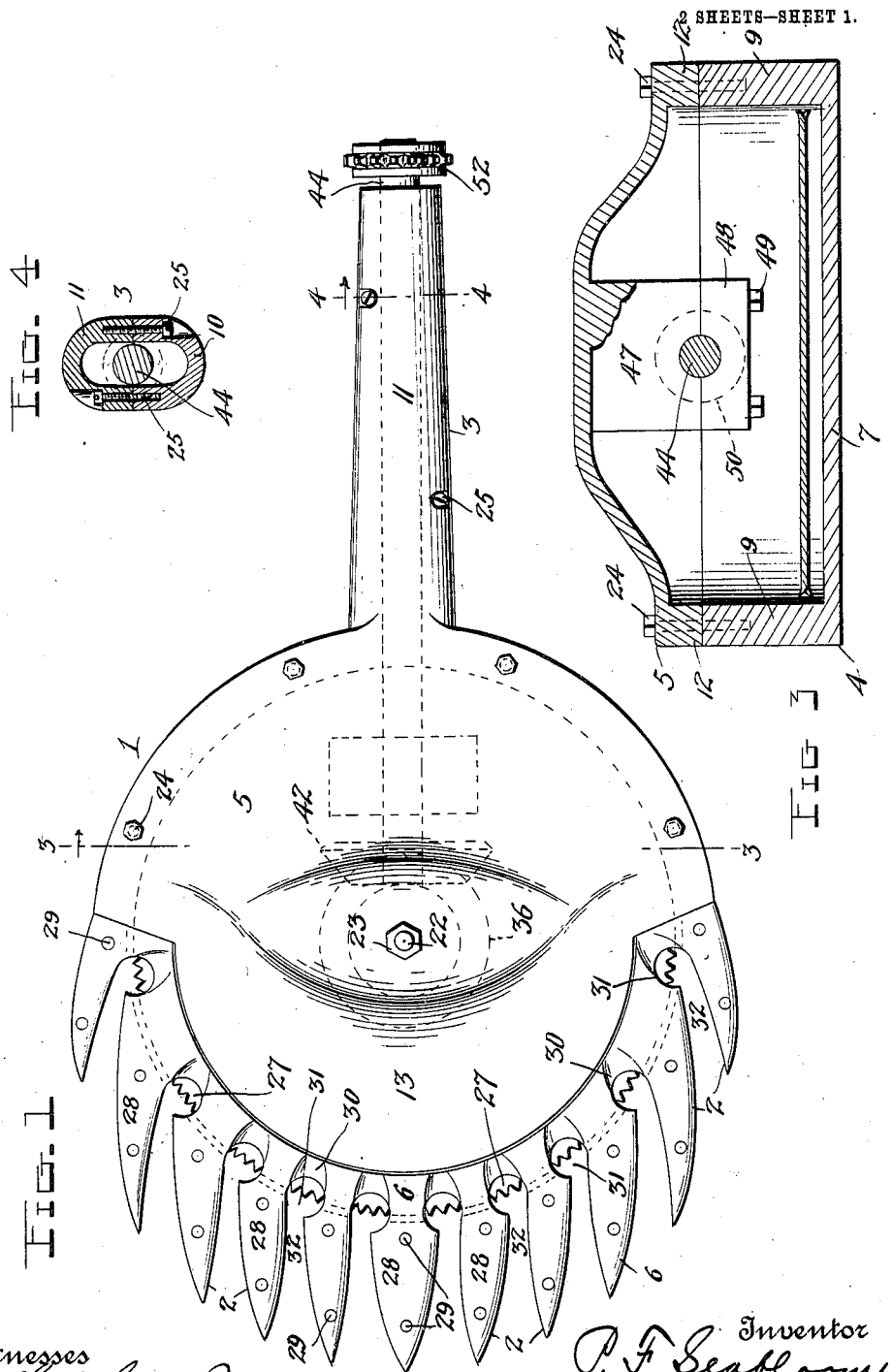

UNITED STATES PATENT OFFICE.

PEHR F. SEABLOOM, OF ORMOND, FLORIDA.

HEDGE-TRIMMER.

No. 844,414.          Specification of Letters Patent.          Patented Feb. 19, 1907.

Application filed October 5, 1906. Serial No. 337,586.

*To all whom it may concern:*

Be it known that I, PEHR F. SEABLOOM, a citizen of the United States, residing at Ormond, in the county of Volusia and State of Florida, have invented certain new and useful Improvements in Hedge - Trimmers, of which the following is a specification, reference being had therein to the accompanying drawings.

My invention relates to improvements in hedge - trimming tools or implements, and more particularly to one having a rotary scythe or cutter.

The object of the invention is to provide a simple and practical device of this character which will greatly lessen the labor of trimming hedges and allow the operator to do more efficient work.

Further objects and advantages, as well as the structural features by means of which they are attained, will be made clear by an examination of the following specification, taken in connection with the accompanying drawings, in which—

Figure 1 is a top plan view of my improved hedge-trimmer. Fig. 2 is a vertical longitudinal sectional view. Figs. 3, 4 are vertical transverse sectional views taken, respectively, on the planes indicated by the lines 3 3 and 4 4 in Fig. 2; and Fig. 5 is a detail plan view of the finger plate or section.

My improved rotary hedge-trimmer comprises a substantially circular body or casing 1, having around its front or outer edge a plurality of fingers 2 and projecting from its rear a handle 3, by means of which the device may be guided over the top and sides of a hedge in trimming the same. This casing is preferably formed in three parts or castings—namely, a bottom section 4, a top cover-section 5, and a finger or tooth section 6. The bottom section 4 comprises a substantially circular plate 7, having projecting from its front or forward edge a plurality of finger-sections 8, which form the lower portions or halves of the fingers 2, the upper portions or halves of the latter being formed by the section 6, as presently explained. The rear portion or edge of the plate 7 is surrounded by an upwardly-projecting flange 9, from the center of which projects the lower half or section 10 of the handle 3. The upper half-section 11 of the latter projects in a similar manner from a depending flange 12, formed around the rear edge of the main portion of the top or cover section 5, said main portion of the latter having its front end concaved, as shown at 13. Upon the center of the bottom of the plate 7 is formed a depending cone-shaped enlargement 14, in the center of which is formed a vertically-extending screw-threaded aperture 15, and formed in the top of the plate 7, concentric with the opening 15, is a cone-shaped seat 16 for an annular row of bearing-balls 17. Also formed upon the top of the plate 7, adjacent to its outer and forward edge and concentric with the opening 15, is an upwardly - projecting rib 18, which extends approximately half-way around the plate. Formed centrally in the main portion of the top section 5 is an opening 19, arranged in vertical alinement with the opening 15 in the plate 7.

The openings 15 19 are adapted to receive the reduced threaded ends 20 21 of a vertical bolt or shaft 22, which serves both to connect the bottom and top sections of the casing together and also as a bearing for the rotary cutter or scythe. The reduced end 20 is screwed into the opening 15 until an annular shoulder, formed at the lower end of the bolt 22 by reducing the same, engages the bottom of the seat 16. A similar annular shoulder is formed at the upper end of the bolt 22 by reducing the same to provide the portion 21, which latter projects through the opening 19 and is adapted to receive a clamping-nut 23. When the latter is screwed down on the part 21, the casing-section 5 is clamped upon the shoulder at the upper end of the rod 22. The sections 4 5 of the casing are further united by a number of machine-bolts or the like 24, arranged in the flanges 12 9, as shown, and the two half-sections 10 11 of the handle 3 are firmly united by similar bolts 25, the heads of which are sunk beneath the outer surface of said handle, as clearly shown in Fig. 4.

Formed around the front and lower edge of the concaved portion 14 of the top section 5 is a depending rib or flange 26, which overlies and is spaced from the rib 18, as shown in Fig. 2. These ribs 18 26 serve as guides for the rotary cutter or scythe 27, which is preferably in the form of a circular saw and is adapted to have its toothed edge work through slots or recesses in the rear portions of the teeth or fingers 2. The finger-section 6 is in the form of a substantially semicircular plate, having its front edge shaped to form tapering finger-sections 28, which overlie the finger-sections 8 on the plate 7 and are secured thereto by rivets or similar fastenings 29. The semicircular inner edge of the plate-section 6 is spaced from the front edge of the rib or flange 26, and in its top or upper surface are formed concave depressions 30, which latter open into substantially circular openings 31, arranged at the rear ends of the spaces 32 between the fingers 2.

The openings 31 are formed in both the section 6 and plate 7 of the bottom section 4 and form pockets in which the twigs are held while being cut by the rotary saw or cutter 27, which has its toothed edge working in said openings. The cutter 27 is formed with a central opening to receive a rotary sleeve 33, which is adapted to rotate upon the bolt or rod 22 and has formed at its lower end a cone-shaped seat 34 for engagement with the bearing-balls 17. Also formed at the lower end of the sleeve 33 is an annular shoulder or flange 35, upon which the cutter 27 is supported, a beveled gear 36 being arranged upon the sleeve 33 above the cutter and being clamped upon the latter by a second sleeve 37 and a clamping-nut 38.

The clamping-sleeve 37 surrounds the sleeve 33, and its upper end is engaged by the nut 38, which is screwed upon the threaded upper end of the sleeve 33. This end of the sleeve 33 is formed with an annular cone-shaped seat 39 for bearing-balls 40, which are retained in said seat by a screw-cap 41, arranged upon the threaded upper end of the sleeve 33. The beveled gear 36 meshes with a similar gear 42, fixed by means of a set-screw 43 upon the forward end of a shaft 44, which extends longitudinally through the handle 3, the sections 10 11 of which latter are made hollow.

The front end of the shaft 44 is mounted for rotation in an annular row of bearing-balls 46, arranged in raceways formed in a bearing-block 47, depending from the under side of the top section 5, and in a bearing-plate 48, which is bolted upon block 47, as shown at 49. A stop-collar 50 is fixedly mounted by means of a set-screw upon the shaft 44, adjacent to the bearing-block 47, so as to prevent longitudinal movement of the shaft 44. The rear end of the shaft 44 is journaled in ball-bearings 51, arranged in the handle-sections 10 11, as shown in Fig. 1. Upon the projecting rear end of the shaft 44 is fixed a sprocket-wheel or pulley 52, which may be rotated by a chain or belt for the purpose of operating the rotary cutter 27. A flexible shafting or any other suitable driving device may be substituted for the element 52.

In using my improved hedge-trimming tool or device it will be understood that a motor or the like from which power is obtained for operating the cutter is mounted so that it can be rolled along adjacent to the hedge, and suitable driving connections are provided between it and the shaft 44. When the latter is rotated, its movement will be imparted by the beveled gears 42 36 to the saw or cutter 27, which latter will quickly sever the twigs gathered in the pockets 31 between the fingers 2. By grasping the device by the handle 3 it may be readily guided over the top and sides of a hedge or the like to quickly and effectively trim the same.

The provision of the pockets or recesses 31 prevents the twigs from slipping out from between the fingers 2 until they are severed by the tooth edge of the cutter, and the provision of the guide-ribs 18 26 prevent the cutter from being sprung up or down, so that its toothed edge will contact with the fingers 2 or other portions of the frame of the device.

The provision of the ball-bearings renders the device easy running, and the manner in which the parts of the casing are assembled and connected permits the device to be readily taken apart for cleaning or for repairs.

Having thus described my said invention, what I claim as new, and desire to secure by Letters Patent of the United States, is—

1. The herein-described hedge-trimming tool comprising a casing having a hollow body, a hollow handle projecting from the rear of said body, a semi-annular series of spaced fingers projecting from the front of said body, twig-receiving pockets being formed at the inner ends of the spaces between said fingers, said pockets being of greater width than the width of the inner ends of said spaces, a driving-shaft mounted for rotation in said handle, a rotary cutter mounted for rotation in said hollow body and having its tooth-cutting edge working through said pockets, gearing between said rotary cutter and the inner end of said driving-shaft, and a driving element fixed upon the projecting rear end of said driving-shaft.

2. The herein-described hedge-trimming tool comprising a hollow body having a handle projecting from its rear portion and a semi-annular row of spaced fingers projecting from its front portion, the inner ends of the spaces between said fingers being contracted and opening into enlarged twig receiving and holding pockets, and a rotary cutter mounted in said casing and having its cutting edge working through said pockets.

3. The herein-described hedge-trimming tool comprising a bottom section having a substantially circular base-plate formed with a rearwardly-projecting handle-section and a semi-annular series of spaced finger-sections, a top casing-section arranged above the plate of said bottom section and having a rearwardly-extending handle-section to coact with the first-mentioned handle-section, a vertical rod uniting said top and bottom sections, a finger-plate formed with spaced finger-sections arranged upon and secured to the first-mentioned finger-sections, the spaces between the fingers formed by the coacting finger-sections having their rear ends contracted and opening into enlarged twig receiving and holding pockets, spaced guide-ribs arranged upon the said top and bottom sections concentric with said vertical connecting-rod, a sleeve mounted for rotation upon said rod and having an annular flange at its lower end, a circular cutter upon said sleeve and engaged with said flange, said cutter working between said guide-ribs and in said pockets, a beveled gear arranged upon said sleeve above said cutter, a clamping-sleeve upon the first-mentioned sleeve and engaged with said beveled gear, a clamping-nut upon the threaded upper end of the first-mentioned sleeve and engaged with said clamping-sleeve, ball-bearings at the opposite ends of the first-mentioned rotary sleeve, a drive-shaft extending through said handle-sections and mounted in bearings therein, a beveled gear fixed upon the inner end of said drive-shaft and in mesh with the first-mentioned beveled gear, and a driving element upon the projecting rear end of said drive-shaft, substantially as shown and described.

In testimony whereof I hereunto affix my signature in presence of two witnesses.

PEHR F. SEABLOOM.

Witnesses:
G. M. WALLACE,
L. E. BOSTROM.